(12) United States Patent
Manzo et al.

(10) Patent No.: US 10,055,470 B1
(45) Date of Patent: Aug. 21, 2018

(54) REAL-TIME QUERY TRANSFORMATION AND DATA RETRIEVAL

(71) Applicant: IMS Health Incorporated, Danbury, CT (US)

(72) Inventors: Marcelo Manzo, Quebec (CA); Christopher Hahn, Seattle, WA (US); Nazmul Hasan, Dhaka (BD)

(73) Assignee: IMS HEALTH INCORPORATED, Danbury, CT (US)

( * ) Notice: Subject to any disclaimer, the term of this patent is extended or adjusted under 35 U.S.C. 154(b) by 542 days.

(21) Appl. No.: 14/696,443

(22) Filed: Apr. 26, 2015

(51) Int. Cl.
*G06F 17/30* (2006.01)

(52) U.S. Cl.
CPC .. *G06F 17/30563* (2013.01); *G06F 17/30339* (2013.01); *G06F 17/30864* (2013.01)

(58) Field of Classification Search
CPC .................................................. G06F 17/30563
See application file for complete search history.

(56) References Cited

U.S. PATENT DOCUMENTS

| | | | | |
|---|---|---|---|---|
| 7,747,475 | B1* | 6/2010 | Bowman | G06Q 20/04 |
| | | | | 705/26.1 |
| 9,305,044 | B2 | 4/2016 | Hahn et al. | |
| 2004/0078251 | A1* | 4/2004 | DeMarcken | G06Q 10/02 |
| | | | | 705/5 |
| 2004/0254947 | A1* | 12/2004 | Dombroski | G06F 17/3048 |
| 2006/0136382 | A1* | 6/2006 | Dettinger | G06F 17/30554 |
| 2006/0161456 | A1* | 7/2006 | Baker | G06F 19/327 |
| | | | | 705/2 |
| 2009/0043788 | A1* | 2/2009 | Averbuch | G06F 17/30312 |
| 2009/0187415 | A1* | 7/2009 | Labahn | G06O 30/08 |
| | | | | 705/1.1 |
| 2009/0271385 | A1* | 10/2009 | Krishnamoorthy | |
| | | | | G06F 17/30445 |
| 2010/0017363 | A1* | 1/2010 | Bellamkonda | G06F 17/30463 |
| | | | | 707/E17.014 |
| 2013/0013329 | A1* | 1/2013 | Brogan | G06Q 30/02 |
| | | | | 705/2 |
| 2013/0166542 | A1* | 6/2013 | Kulkarni | G06F 17/30879 |
| | | | | 707/722 |
| 2016/0019619 | A1* | 1/2016 | Somaiya | G06Q 30/0625 |
| | | | | 705/26.62 |

* cited by examiner

*Primary Examiner* — Mahesh H Dwivedi
(74) *Attorney, Agent, or Firm* — Maldjian Law Group LLC

(57) ABSTRACT

A method and system to retrieve data dynamically from one or more datasets are disclosed. The method comprises receiving at least one query in a first query language. Thereafter, splitting the at least one query in the first query language into a plurality of sub-queries and transforming the plurality of sub-queries into one or more second query languages, wherein the one or more second query languages correspond to the one or more datasets. Other embodiments include a method that comprises processing the one or more transformed queries to retrieve one or more query results from the one or more datasets, and processing the one or more query results to generate a data presentation.

18 Claims, 12 Drawing Sheets

250

```
{
  "dimensions": {
    "customer": {
      "schemaName": "analytical_store",
      "tableName": "customer",
      "attributes": {
        "id": {
          "columnName": "customerid",
          "name": "id"
        },
        "name": {
          "columnName": "customer_name",
          "name": "name"
        },
        "desc": {
          "columnName": "customer_desc",
          "name": "name"
        },
        "active": {
          "columnName": "is_active",
          "name": "active"
        },
        "hierarchies": {}
      },
      "kpis": {
        "growth": {
          "name": "growth",
          "calculation": "case when @value[pyp(1)]>0 then (@value - @value[pyp(1)])",
          "description": null
        },
        "ms": {
          "name": "ms",
          "calculation": "@value / @value[hpl(1)]",
          "description": null
        }
      }
    }
  }
}
```

```
{
    attributes:
    [                                                                          ⎫
        {name: "country_code", displayName: "countryCode" },                   ⎬ 202
        {name: "country", displayName: "Country"},                             ⎪
        {name: "month", pivot:true}                                            ⎭
    ],
    kpis:
    [                                                                          ⎫
        {name: "@value[Sales_volume]", displayName:"Volume Sales",             ⎬ 204
         numberFormat:"#,#.00" },                                              ⎪
        {name: "@growth[Sales_volume]", displayName:"Volume Growth",           ⎪
         numberFormat:"#,#.00" },                                              ⎭
    ],
    filters:
    [                                                                          ⎫
        {name: "region", in:["NA", "EMEA"]},                                   ⎬ 206
        {name: "product", equal:"Lipitor"},                                    ⎪
        {name: "month", between:["Jan-14", "May-14"]},                         ⎭
    ],
    exchangeRates:
    {                                                                          ⎫
        countryAttribute: "country",                                           ⎪
        periodAttribute: "month",                                              ⎬ 208
        rates:                                                                 ⎪
        [                                                                      ⎪
            { country: "UK", period: "May-14", rate: 1.23 },                   ⎪
            { country: "USA", period: "May-14", rate: 0.95 }                   ⎪
        ]                                                                      ⎭
    },
    factors:
    {                                                                          ⎫
                             kpis: ["@marketshare"], //Applies the factors on marketshare   ⎬ 210
    data:                                                                      ⎪
    [                                                                          ⎪
        { product: "Lipitor", country: "UK", factor: 1.2 },                    ⎪
        { product: "Avodart", country: "USA", factor: 1.3}                     ⎪
    ]                                                                          ⎭
    },
    formatter: {                                                               ⎫
        rowStructure: "flat",                                                  ⎬ 212
        pivotColumnDisplayName: "{0}_{1}" };                                   ⎭
```

FIG. 2B

| Country | May Sales | Jun Sales |
|---|---|---|
| A | 10 | 12 |
| B | 14 | 16 |

FIG. 6B

| Country | Month | Sales |
|---|---|---|
| A | May | 10 |
| A | Jun | 12 |
| B | May | 14 |
| B | Jun | 16 |

FIG. 6A

```
{
  columns:
  [
      {name: "Country", ordinal:0, type:"attr"},
      {name: "Period", ordinal:1, type:"attr"},
      {name: "Sales Value", ordinal:2, type: "kpi"},
  ],
  rows:
  [
      {cells: [], rows:[]},
      {cells: [], rows:[]},
  ]
}
```

REAL-TIME QUERY TRANSFORMATION AND DATA RETRIEVAL

BACKGROUND

Field of the Invention

Embodiments of the present invention generally relate to data management techniques, and, in particular, to a system and method for dynamic configuration and data retrieval in a data management system.

Description of Related Art

Software applications and services generally use various mechanisms for optimizing queries and retrieving data from datasets. Typically, software application developers hard-code these analytical systems. For example, if a user of an application desires to modify a data model, such as add an additional product within the data model, of a dataset then source code of the data model can only be modified by a software application developer, which is both time-consuming and inconvenient. However, the user cannot modify and/or configure the data model of the dataset. Further, the analytical systems provide a Graphical User Interface (GUI) based tool that connects directly to a Structured Query Language (SQL) database with a pre-defined star schema, or other schemas. The pre-defined schema may include fact tables that refer to any number of dimension tables. However, these GUI based tools with the pre-defined star schema are static and are not easily programmable.

Furthermore, these analytical systems are often custom built per use-case and therefore, do not enable users to derive benefits of a shared infrastructure. As a result, the users are saddled with low performance and low flexibility when their business needs a change. Therefore, improved mechanisms for optimizing queries and data retrieval are required.

SUMMARY

Embodiments in accordance with the present disclosure provide a computer-implemented method for data retrieval from one or more datasets. The method comprising: receiving at least one query in a first query language; splitting the at least one query in the first query language into a plurality of sub-queries; transforming the plurality of sub-queries into one or more second query languages, wherein the one or more second query languages correspond to the one or more datasets; processing the one or more transformed queries to retrieve one or more query results from the one or more datasets; and processing the one or more query results to generate data presentation.

Embodiments in accordance with the present disclosure provide a system for data retrieval from one or more datasets. The system comprising: a query analysis module configured to: receive the at least one query in a first query language; and split the at least one query in the first query language into a plurality of sub-queries. The system further comprises a sub-query engine coupled, at least, to the query analysis module, wherein the sub-query engine is configured to: transform the plurality of sub-queries into one or more second query languages, wherein the one or more second query languages correspond to the one or more datasets; and process the one or more transformed queries to retrieve one or more query results from the one or more datasets. The system also comprise an output module coupled, at least to, the sub-query engine, wherein the output module is configured to process the one or more query results for generating a data presentation.

Embodiments in accordance with the present disclosure provide a computer-implemented method for data retrieval from a dataset, the method including: receiving a query for data retrieval and configuration of one or more datasets, wherein the query is in a first query language; splitting the at least one query in the first query language into a plurality of sub-queries; transforming the plurality of sub-queries into one or more second query languages, wherein the one or more second query languages correspond to the one or more datasets; configuring one or more data models in the one or more datasets based on the one or more sub-queries; processing the one or more transformed queries to retrieve one or more query results from the one or more datasets; and processing the one or more query results to generate a data presentation.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein:

FIG. 2A illustrates an example of a configuration JSON file in accordance with an embodiment of the present disclosure.

FIG. 2B illustrates an exemplary query for retrieval of data from the datasets, according to an embodiment of the present disclosure;

FIGS. 6A and 6B illustrate an exemplary result as an unpivoted table and a pivoted table, in accordance with an embodiment of the present invention;

FIG. 7 illustrates an exemplary output data expression, in accordance with an embodiment of the present invention;

Figure 1:
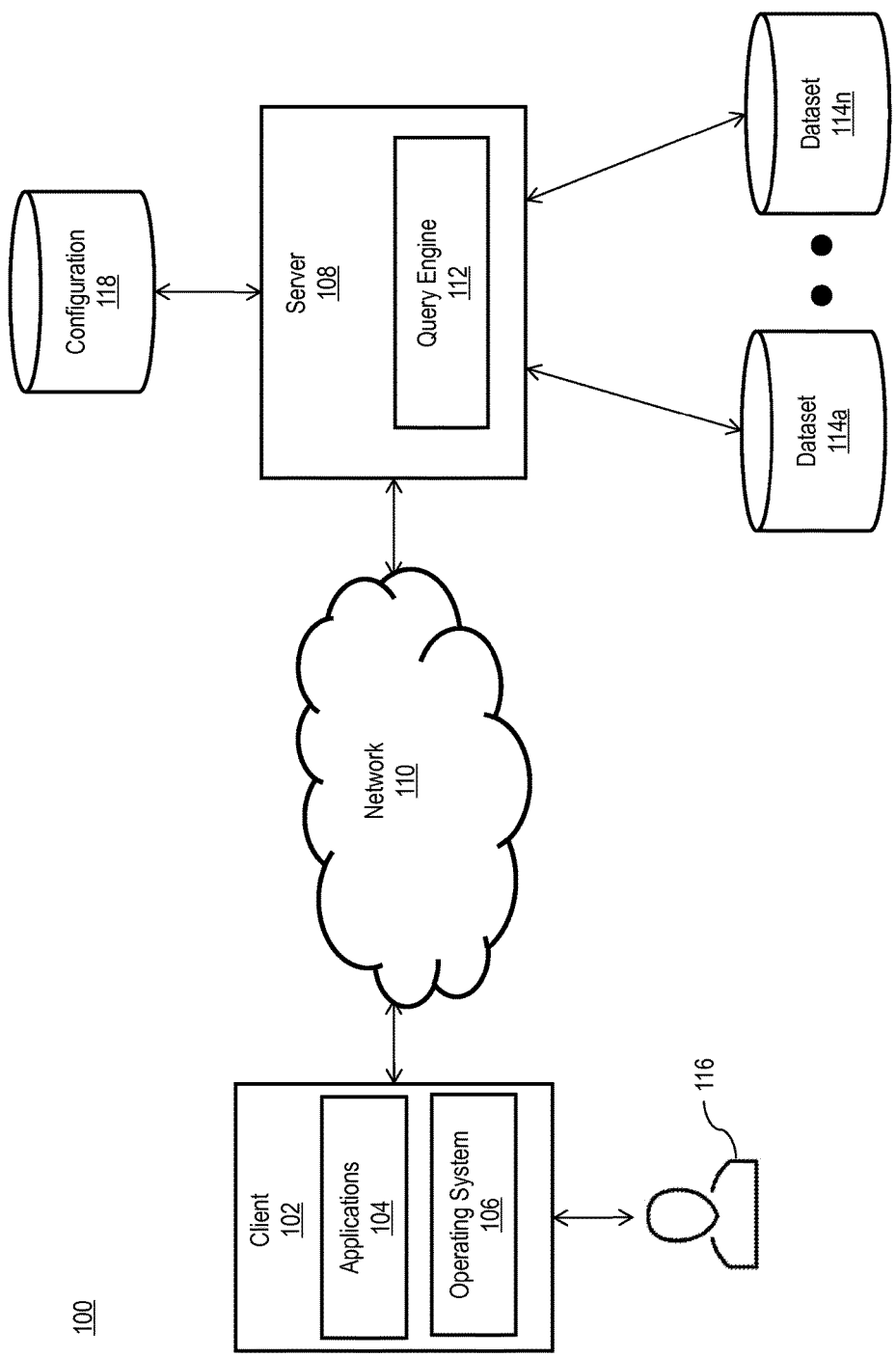
FIG. 1 depicts a system for data retrieval from datasets, according to an embodiment of the present disclosure.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The disclosure will be illustrated below in conjunction with an exemplary digital information system. Although well suited for use with, e.g., a system using a server(s) and/or database(s), the disclosure is not limited to use with any particular type of system or configuration of system elements. Those skilled in the art will recognize that the disclosed techniques may be used in any system or process in which it is desirable to provide a transferable permission to access information or control a decision.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

The term "computer-readable medium" as used herein refers to any tangible storage and/or transmission medium that participate in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

FIG. 1 depicts a system 100 according to an embodiment of the present disclosure. System 100 enables dynamic data retrieval from datasets by using human friendly and easy to create queries. As shown, a client 102 may request a server 108 for data over a network 110. In one embodiment of the present invention, server 108 may provide a web service that can be used by one or more clients over a network. A query engine 112 of server 112 processes the request or query received from client 102 to retrieve data from one or more datasets 114a-n. Subsequently, the retrieved data is presented on client 102.

In one embodiment of the present invention, client 102 may be, but is not restricted to, a computer, a laptop, a Personal Digital Assistance (PDA), a tablet, a smart phone, a palmtop, a notebook, a mobile phone, or any other computing device. It is also contemplated that client 102 may support any type of user interface for supporting the presentment of data. In addition, client 102 may facilitate various input means for receiving, including, but not restricted to, a touch screen capability, a keyboard and keypad data entry, a voice-based input mechanisms, and the like. As shown, client 102 may include applications 104 and an Operating System (OS) 106. In one embodiment of the present invention, application 104 may be any analytical software application or service such as, but are not restricted to, business intelligence software, productivity software, education software, communications software, or the like. OS 106 may provide basic execution environment for applications 104 on client 102.

As noted above, the query may be transmitted from client 102 to server 108 through network 110. In one embodiment of the present invention, network 110 may be, but is not restricted to, a telephony network, a wireless network, a data network, a service provider data network, and the like, in an embodiment of the present invention. For example, the telephony network may include, but is not restricted to, a circuit-switched network, such as the Public Switched Telephone Network (PSTN), an Integrated Services Digital Network (ISDN), a Private Branch Exchange (PBX), or other like networks. The service provider network may embody circuit-switched and/or packet-switched networks that may include facilities to provide for transport of circuit-switched and/or packet-based communications. It is further contemplated that communication network 110 may include components and facilities to provide signaling and/or bearer communications between the various components or facilities of system 100. In this manner, communication network 110 may embody or include portions of a Signaling System 7 (SS7) network, or other suitable infrastructure to support control and signaling functions. In addition, system 100 may operate as separate parts that rendezvous and synchronize periodically to form a larger system with similar characteristics. Further, the data network may be any Local Area Network (LAN), Metropolitan Area Network (MAN), Wide Area Network (WAN), the Internet, or any other suitable packet-switched network, such as a commercially owned, proprietary packet-switched network, such as a proprietary cable or fiber-optic network. Further, the wireless network may employ various technologies including, for example, Code Division Multiple Access (CDMA), Enhanced Data Rates For Global Evolution (EDGE), General Packet Radio Service (GPRS), Mobile Ad Hoc Network (MANET), Global System For Mobile Communications (GSM), 4G Long-Term Evolution (LTE), Internet Protocol Multimedia Subsystem (IMS), Universal Mobile Telecommunications System (UMTS), etc., as well as any other suitable wireless medium, e.g., microwave access (WiMAX), IEEE 802.11 (WiFi), satellites, and the like. In another embodiment of the present invention, client 102 may be a part of server 108. For example, client 102 may be a software application running on server 108 for sending queries to retrieve data.

Query engine 112 of server 108 receives the request or query from client 102. In one embodiment of the present invention, client 102 may request for the information stored in datasets 114. Generally, datasets include information or data models that can be retrieved based on a specific query language. For example, a Structured Query Language (SQL) dataset can be queried by using SQL query. In one embodiment of the present invention, query engine 112 analyzes and processes the query received from client 102 in a first query language. The first query language may be in form of a human readable format to enable data exchange between server 108 and client 102. In one embodiment of the present invention, the first query language may be in JavaScript Object Notation (JSON) data exchange format. However, a person skilled in the art will appreciate that any other data exchange format that enables human readable elements may be used, for example, but not limited to eXtensible Markup Language (XML). Typically, JSON is frequently used for data exchange for web based applications, and provides data representation in attribute-value pairs. For example, in a JSON expression such as {"age": "25"}, "age" may be the attribute and "25" is the value. Consequently, the format of expression in JSON is human readable and can be easily extended. Query engine 112 processes the query received to determine the structure and components of the query. For example, the attribute-value pairs may be determined in case of a JSON query.

In one embodiment of the present invention, query engine 112 may split the query into one or more sub-queries. For example, the sub-queries may be generated for retrieving information from various databases. The sub-queries may be transformed into one or more second query languages, according to an embodiment of the present disclosure. The second query language may include, but is not restricted to Multidimensional Expressions (MDX), SQL, or the like, according to an embodiment of the present disclosure. The data may then be retrieved from datasets 114 based on the sub-queries, and subsequently presented to user 116 of client 102. In an exemplary scenario, user 116 may query a business database for current currency exchange rates from a browser on client 102. Accordingly, query engine 112 processes the query, transforms the query, and retrieves the data from datasets 114 and transmits the data to client 102. The data may then be presented to user 116 on the browser of client 102. Therefore, user 116 may not be required to generate or hardcode complex queries for retrieval of data. In one embodiment of the present invention, query engine 112 may enable configuration of datasets 114 based on the query received from client 102. For example, a data model at query engine 112 for retrieval of data from datasets 114 may be configured to process the query and retrieve data in a different format, without changing underlying dataset 114. Generally, a data model may define the structure of datasets 114 and further determines how the data may be stored, or manipulated within datasets 114. The components of query engine 112 are described below in conjunction with FIG. 2B.

In one embodiment of the present invention, system 100 includes a configuration 118. Configuration 118 may be a database that includes metadata information about datasets 114, in one embodiment. Further, configuration 118 may include information required to configure the query or results generated by the query. For example, configuration 118 may user preferences or authorizations for interacting with query engine 112 or datasets 114. In one embodiment of the present invention, configuration 118 may store criteria that may be common for multiple queries, according to an embodiment of the present disclosure. Further, in one embodiment of the present invention, configuration 118 may be implemented as a service or application for query engine 112. For example, configuration 118 may be provided by a service provider connected to server 108 over a communications network.

FIG. 2A illustrates an example of a configuration JSON file 250 in accordance with an embodiment of the present disclosure. The JSON configuration file acts as a definition of data and KPI formulas, to be used by query engine 112. Query engine 112 use this data definition to convert a JSON query to an SQL query.

The elements of system 100 are shown in FIG. 1 for purposes of illustration only and should not be construed as limiting embodiments of the present invention to any particular arrangement of elements. Various other system components such as a gateway, a firewall, etc., are known by persons of skill in the art of computer networking, but are not depicted in FIG. 1 in order to avoid obscuring the main elements of system 100.

FIG. 2B is an exemplary query 200 received at query engine 112, according to an embodiment of the present invention. Although, query 200 is in a JSON format, a person skilled in the art will appreciate that this is just for the purpose of illustration, and any other language for query 200 may be used. In an exemplary scenario, datasets 114 may include analytical information related sales of medicines across multiple countries. Query 200 may be provided to retrieve information related to sales of medicine from datasets 114. As shown, query 200 may include objects such as a list of attributes, a list of Key Performance Indicators (KPIs), filters, exchange rates, factors, formatter, or a combination thereof. In one embodiment of the present invention, each of the objects in query 200 represents a column of a dimension table or a label in a hierarchy.

A list of attributes 202 may be an array of attribute objects having various properties. For example, a 'name' property may have a value as "country_code", and a 'displayName' property may be a name to be shown in an output data. For example, in query 200, the value of "displayName" property is "countryCode". Further, various other properties for the list of attributes 202 may be provided. For example, 'topCount' with a value of 10 may provide a list of top 10 countries by sales from a list of various countries. Similarly, a name of the KPI may be used to select the 'topCount' members of the attribute by using 'topCountKpi' property. An 'alwaysInclude' property may be used along with the 'topCount' property of the attribute to include a specific object. For example, if the user desires to always include some members of the attribute whether they are in top N or not then 'alwaysInclude' attribute may be used. A 'pivot' property may be either True or False. This property may be used to pivot a query result to generate analytical reports. Further, a 'visible' property as either True or False, may be used to hide the display of output data of KPI calculation. A 'sortOrder' property may be used to sort rows of data based on a criteris (e.g., ascending or descending sales figures). In one embodiment of the present invention, the values of one or more of the properties may be predefined. For example, the 'sortOrder' may be predefined as ascending.

Generally, KPIs may be used to calculate performance of an entity. For example, KPI may be defined for a business or an organization to determine customer satisfaction, business revenue, quality control, and the like. As shown in FIG. 2B, KPIs 204 includes properties such as "name", "displayName", and "numberFormat". The 'name' property may define the name of the KPIs 204, and the 'displayName' property may be a name that is displayed in the output data. In one exemplary scenario, if the 'displayName' is not provided, then it may be derived from the 'name' property. The 'numberFormat' property may be used to format KPIs 204. Examples of the standard 'numberFormat' that can be used include, but are not restricted to, '%', '#, #.0', and the like. Further, various other properties may be defined for KPIs 204, such as a 'Formula', 'sortOrder', 'sortType', 'excludeFromPivot', or 'visible' etc. For example, the 'Formula' property may be used for the calculation of the KPI, the 'sortOrder' property may be used to specify a number of rows in the KPI, and the 'sortType' property may be used to specify a type of sorting (e.g., ascending or descending). The 'excludeFromPivot' property may be set 'True' if the user desires to exclude the KPI from being pivoted, and a 'visible' property define whether the KPI value is to be visible or not in the output. In an exemplary scenario, the formula "@growth[Sales_volume]" as shown for KPIs 204 may calculate a growth in sales volume for a product. Similarly, various other formulas may be specified for calculation of output or results.

Query 200 may further include a list of filters 206. Filters 206 may be used to select an attribute to be included in the search results, according to an embodiment of the present invention. Filters 206 may include properties such as 'name' and '<operator>'. The 'name' property may define a name of the dimension column or a KPI on which a filter may be applied. The '<operator>' property specifies an operator to be used for applying a filter. Examples of '<operator>' include 'equal', 'in', 'like', 'between', 'greater than' etc. As shown in FIG. 2B, the expression { name: "product", equal: "Lipitor" }, means that a filter may be applied to select "Lipitor" as "product". In the above exemplary scenario, the filter may be used when sales arising from the product "Lipitor" are required to be determined. In an embodiment of the present invention, filters 206 may be stored in configuration 118, which may further be applied on queries received from client 102. Further, a filter may be used to restrict access on data. For example, a user may be allowed access to the data of only a particular country by storing a country filter in configuration 118.

Query 200 includes an object 'exchange rate' 208. This 'exchange rate' 208 may be used to apply exchange rates on the data retrieval or calculation. In an embodiment of the present invention, the 'exchange rate' may be used replace pre-stored rates with those specified by the user. Further, 'exchange rate' 208 may have properties such as 'countryAttribute', 'periodAttribute', 'rates' etc. As shown in FIG. 2B, the exchange rate for May 2014 is 1.23 for UK, and 0.95 for USA. Therefore, in this example, the price value of a product in USA may be calculated by multiplying it by 0.95. In an embodiment of the present invention, the country and period attributes may not be specified when a single exchange rate may be applied for all countries.

Further, query 200 includes object factors 210. Factor 210 may be used to select KPIs or data to be retrieved from datasets 114. In an embodiment of the present invention, factors 210 include user defined values that may be applied on specified KPIs. Factors 210 may include properties such as 'kpis' and 'data'. The 'kpis' property may specify an array of KPI names on which the factor needs to be applied. Further, the 'data' property may be an array including a list of attribute values and factor values. As shown for factors 210, has a factor 1.2 for 'Lipitor' and factor 1.3 for 'Avodart' may mean that therapeutic benefit of 1.2 dosage of the 'Lipitor' equals 1.3 dosage of 'Avodart'. Further, multiple 'data' properties may be added to factors 210.

Query 200 further includes an object formatter 212. Formatter 212 object may be used to configure the output data retrieved from query 200. In one embodiment of the present invention, the formatting may be performed based on user requirement. The properties of the formatter include 'rowStructure', 'pivotColumnDisplayName' etc. The 'rowStructure' property defined whether the row structure of the output data may be 'flat' or 'hierarchical', and the 'pivotColumnDisplayName' property may be used to define column names after pivoting the output data. A person skilled in the art will appreciate that various other properties may be defined and used based on the requirement of the user. Therefore, query 200 may be customized for various properties and objects, enabling dynamic data retrieval and data model configuration.

Figure 3:
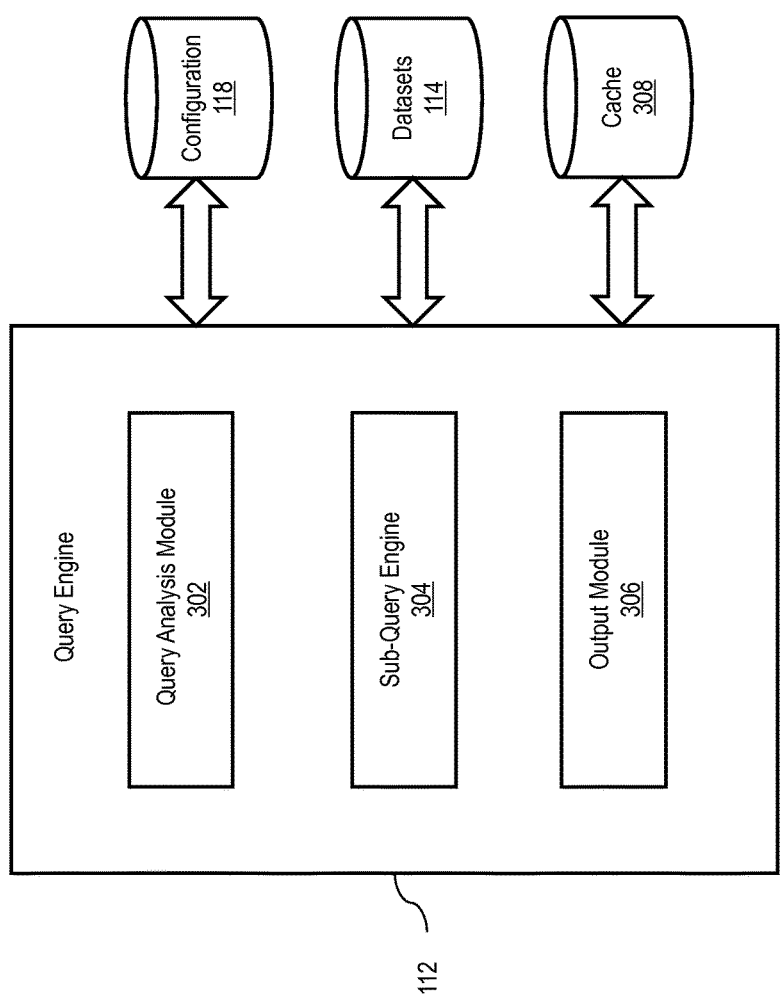
FIG. 3 depicts components of a query engine, according to an embodiment of the present disclosure.

FIG. 3 is a diagram of components of query engine 112 for data retrieval from datasets 114, according to an embodiment of the present disclosure. Query engine 112 may include various executable modules for performing one or more computing, data processing, or network based instructions that in combination to enable data retrieval from datasets 114. Such modules may be implemented in hardware, firmware, software, or a combination thereof. The components of query engine 112 may include, but are not restricted to, a query analysis module 302, a sub-query engine 304, and an output module 306, according to an embodiment of the present invention. Query engine 112 may further be connected to a configuration 118, datasets 114 and a cache 308.

Query analysis module 302 may be configured to receive a query from client 102, according to an embodiment of the present invention. For example, the query may be query 200 for retrieving data from or for configuring datasets 114. In one embodiment of the present invention, query analysis module 302 analyzes the query for its structure and components, such as the objects, attributes and properties. Further, query analysis module 302 determines configuration information from configuration 118, in one embodiment of the present invention. Moreover, query analysis module 302 may validate the query for KPIs. Query analysis module 302 may split the query into one or more sub-queries. In one embodiment of the present invention, the splitting of the query into the sub-queries is based at least in part on the configuration information, the components of the query, or a combination thereof. For example, a query 's1' may be split into three sub-queries such as a first sub-query 'sq1', a second sub-query 'sq2', and a third sub-query 'sq3'. The sub-queries may then be sent to sub-query engine 304 for processing.

Sub-query engine 304 processes the sub-queries to retrieve information or output from datasets 114, according to an embodiment of the present invention. For example, sub-query engine 304 may transform the sub-queries into one or more second query languages, retrieve the results of query from datasets 114, merge the results, or a combination thereof. Sub-query engine 304 may communicate with datasets 114 and cache 308 to retrieve the data. The components and functions of sub-query engine 304 are explained in detail in conjunction with FIG. 4.

Output module 306 processes the results of the query received from sub-query engine 304 to generate data for data representations, according to an embodiment of the present invention. For example, output module 306 may format and prepare the results for presentation on a user interface of client 102. The components and functions of output module 306 are explained in detail in conjunction with FIG. 5. Therefore, query engine 112 enables user 116 to use simple, human readable queries for retrieving data from datasets 114. Further, user 116 may configure the data models by using query engine 112.

Embodiments query engine 112 provide a high-volume environment in which queries may be modified during execution (i.e., "on-the-fly") in order to be dynamic and in order to provide fast turnaround times. Configurations of the query engine 112 may be changed in order to accommodate on-the-fly changes to a data model (e.g., reconfigure the data model, add new elements to the model, move attributes, etc.) and to create or change formulas, which results in on-the-fly compilations. A compilation may refer to, e.g., a task of transforming a query in one language or format to a query in another language like SQL, MDX, etc. Configurations of the query engine 112 may include changes to a data model used or accessed by query engine 112, changes to KPI formulas, changes to hierarchical relationships between portions of the data model, and so forth. Changes to the data model may include a change to the grouping of data elements on the fly. A hierarchy may be known as a grouping of elements in different levels. For example, a hierarchy may group countries to continents, then continents to the entire world.

Embodiments may allow a user to modify query engine 112, add the new formula, and to calculate results using this metric. For example, a customer may want to add a new KPI to the calculations. Thus, embodiments facilitate on-the-fly changes in the data model and/or configuration changes to the KPI.

Figure 4:
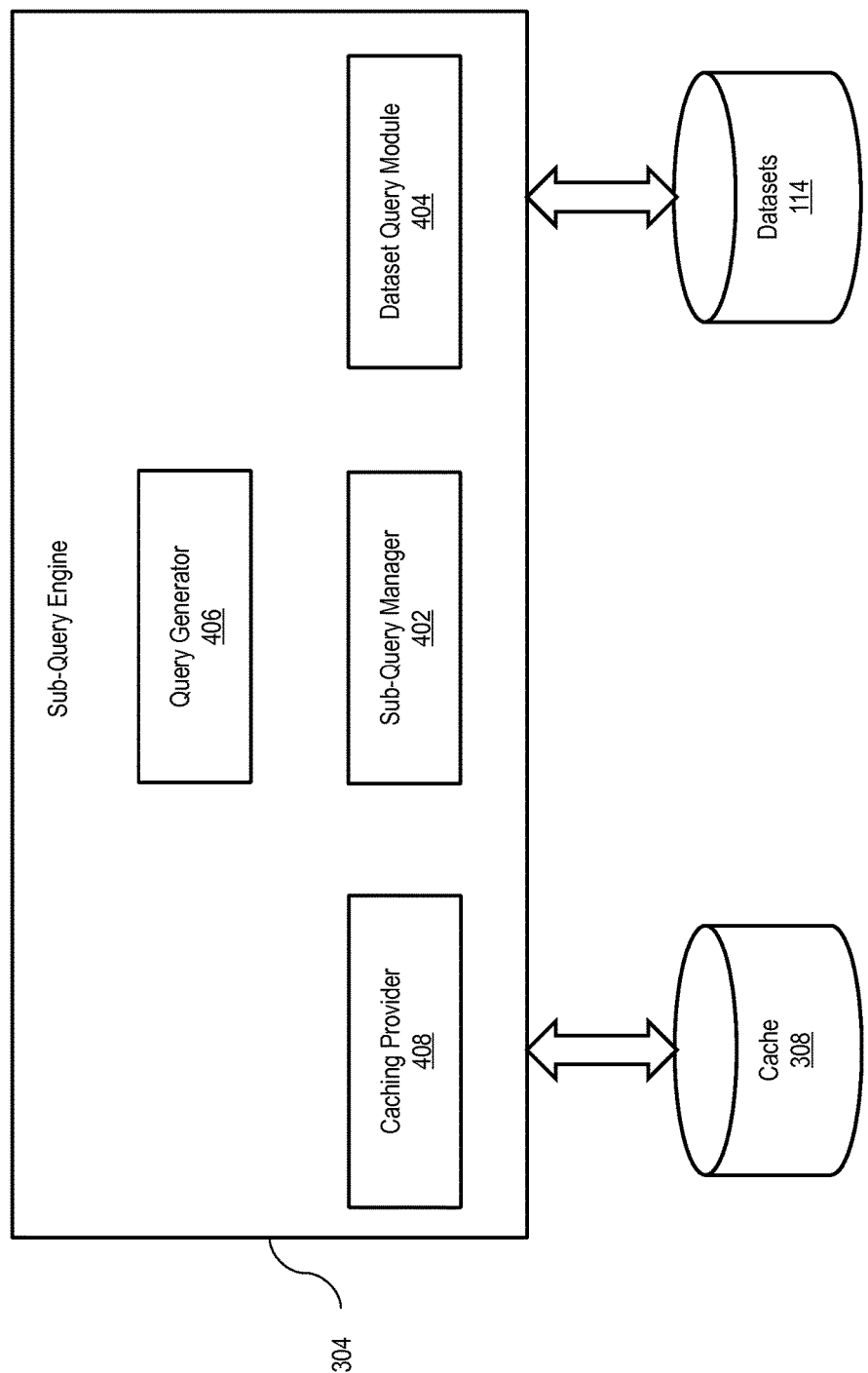
FIG. 4 depicts components of a sub-query engine, according to an embodiment of the present disclosure.

FIG. 4 is a diagram of components of sub-query engine 304, according to an embodiment of the present disclosure. As discussed above, sub-query engine 304 processes the sub-queries to retrieve information or output from datasets 114. In one embodiment of the present invention, the sub-queries are received by a sub-query manager 402 of sub-query engine 304. A query generator 406 processes the sub-queries received from sub-query manager 402. In one embodiment of the present invention, query generator 406 transforms a sub-query into one or more second query languages. For example, the second query language may be MDX, SQL, and the like. The one or more second query languages correspond to datasets 114, according to an embodiment of the present invention. For example, one dataset may be a SQL database and may therefore be queried by using SQL query.

In one embodiment of the present invention, a dataset query module 404 of sub-query engine 304 processes the sub-queries transformed by query generator 406 to retrieve data from datasets 114. The transformed sub-queries may be processed in parallel by dataset query module 404. In an exemplary scenario, a query for comparison of sales of a product in 'January 2015' with 'January 2014' may be split into two sub-queries, one for January 2015 and another for January 2014. Accordingly, dataset query module 404 queries datasets 114 for January 2015 and January 2014 in parallel, so as to reduce data retrieval and computation time. In one embodiment of the present invention, dataset query module 404 may send query based on the format of dataset 114. For example, example an SQL dataset may be a queried by using SQL queries. Further, dataset query module 404 may merge the retrieved query results, in an embodiment of the present invention. For example, in continuation with the exemplary scenario above, the results for sales data of January 2015 and January 2014 may be merged to generate an output data, such as growth value etc.

In one embodiment of the present invention, the merging of the result data may be performed in a memory data structure. In this case, a caching provider 408 of sub-query engine 304 may cache the queries in cache 308 for faster processing. For example, cached sub-queries or their results may be used by other queries without again retrieving or re-calculating the data. In an exemplary scenario, a query q1 may be split into three sub-queries sq1, sq2 and sq3, and a query q2 splits into sub-queries sq1, sq2 and sq4. Therefore, if sq1 and sq2 of the query q1 are cached in cache 308 by caching provider 408, then sq1 and sq2 may also be used for q2 by retrieving data directly from cache 308. Consequently, merging of sub-queries in the memory is fast.

In another embodiment of the present invention, the merging of the result data may be performed within a database. In an embodiment of the present invention, dataset query module 404 may merge the results in a database by using database functions or queries, such as JOIN, UNION, and the like. The merging data in a database may enable faster merging of large datasets. Further, the SQL may be reused to create views required for other tools. In one embodiment of the present invention, merging may be performed based on the configuration stored in configuration 118. The result data generated by sub-query engine 304 may then be processed by output module 306 for presentation to user 116.

Figure 5:
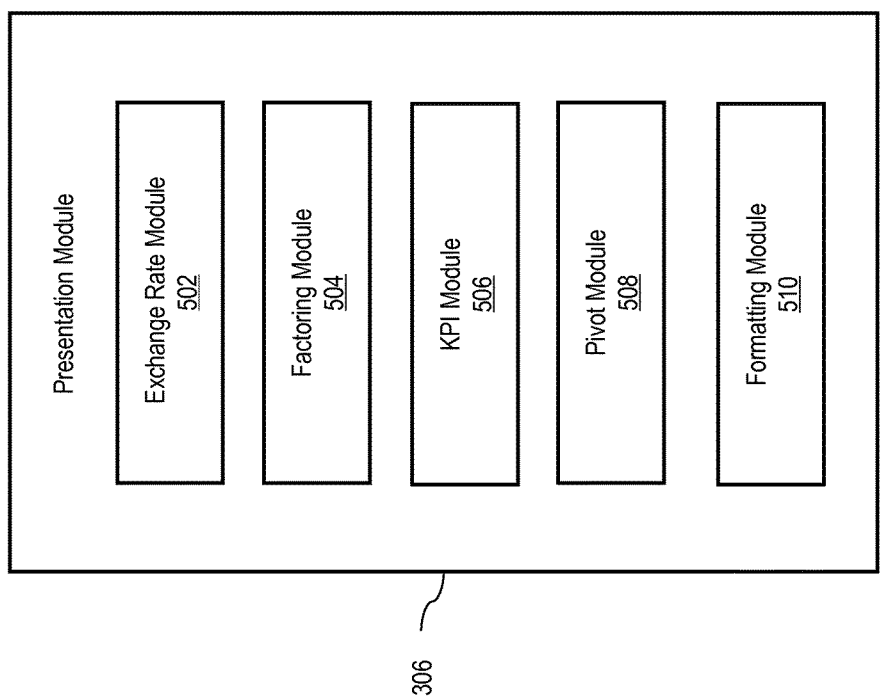
FIG. 5 depicts components of an output module, according to an embodiment of the present disclosure.

FIG. 5 is a diagram of components of output module 306, according to an embodiment of the present disclosure. As noted previously, output module 306 formats the query results for data presentation based for display on client 102. The data presentation may include, but not limited to, tables, reports, bar graphs, pie charts, line charts, histograms, and the like. In one embodiment of the present invention, output module 306 includes an exchange rate module 502, a factoring module 504, a KPI module 506, a pivot module 508, and a formatting module 510.

In one embodiment of the present invention, exchange rate module 502 processes the one or more query results based on an exchange rate parameter. For example, as also shown in FIG. 2B for query 200, the exchange rate parameter for May 2014 is 1.23 for UK, and 0.95 for USA. Therefore, in this example, the price value of a product in USA may be calculated by multiplying it by 0.95. In one embodiment of the present invention, attributes or properties for applying the exchange rate may be determined by exchange rate module 502 from configuration 118.

In one embodiment of the present invention, factoring module 504 factors the query results processed by exchange rate module 502, based on a factoring parameter. As shown for factors 210 in FIG. 2B, the factor or factoring parameter for 'Lipitor' is 1.2 and for 'Avodart' is 1.3, therefore the therapeutic benefit of 1.2 dosage of the 'Lipitor' equals 1.3 dosage of 'Avodart'. In another exemplary scenario, a product such as a medicine may be used for two different diseases headache and foot pain. Then a factoring parameter of 60 for headache and 40 for foot pain, may relate to a 60% market share of that medicine for headache and 40% for foot pain.

In one embodiment of the present invention, KPI module 506 evaluates KPI formulas and returns a calculated value. As noted previously, the KPI may be defined for a business or an organization to determine customer satisfaction, business revenue, quality control, and the like. In an embodiment, the KPI may be classified as a base KPI, a calculated KPI, a special KPI, or a combination thereof. As shown in FIG. 2B, KPIs 204 may include formulas for calculation of an output. In one embodiment of the present invention, the base KPI is a KPI that may be calculated or evaluation in datasets 114. A generic KPI formula may be defined as @value[<measure name>, <period specifier>, <hierarchy level specifier>], where <measure name>may be the name of the measure for which the value may be retrieved, <period specifier>may be the period over which the value is to be calculated, and <hierarchy level specifier>may be used to calculate value for a particular level (i.e., current or parent level) in a hierarchy. In one embodiment of the present invention, the <period specifier>and <hierarchy level specifier>may be optional and a pre-defined values may be associated with them. In an exemplary scenario, a KPI formula specified as @value[USD_Sales, March] calculates and returns the value of the sales in US Dollar (USD) for a product in the month of March of the current year. Similarly, a KPI formula specified as @value[USD_Sales, March, Previous_Year_Period(1)] calculates and returns the value of the sales in US Dollar (USD) for a product in the month of March of the previous year in the hierarchy (i.e., for March 2014 if the current year is March 2015).

In some embodiments, a filter of other attributes may be passed by way of a KPI formula. For example, a KPI formula specified as @value[Sales_Volume,$country=USA] may be used to calculate and to return the sales volume for the specified country (i.e., "USA" in this example).

In one embodiment of the present invention, a calculated KPI may be defined as an expression that may use other KPIs to calculate a result. For example, the calculated KPI may be used to calculate a growth in sales for a product over a specified time period. In an exemplary scenario, if the current year is 2015 then, as discussed above, the sales value for the current and the previous year may be calculated by using expressions @value and @value[Previous_Year_Period(1)). Therefore, in this case, a calculated KPI may be for example @growth that maybe calculated by using the expression: @growth =(@value-@value [Previous_Year_Period(1)])/@value[Previous_Year_Period(1)]. Similarly, other calculated KPIs may be defined, for example, to calculate marketshare. Further, the calculated KPI such as @growth may itself be used for other calculated KPIs, for example growth in growth of sales volume may be calculated by using the expression: @growthGrowth=( @growth-@growth[Previous_Year_Period (1)])/@growth[Previous_Year_Period (1)]. Therefore, the KPI formulas are human readable and extensible. A person skilled in the art will appreciate that the expressions discussed above for the formulas are exemplary, and various other modifications and additions are possible.

In one embodiment of the present invention, the expressions for the calculated KPIs may be evaluated in a memory data structure. Therefore, the base KPI may be retrieved from datasets 114 and then the calculations for the calculated KPIs may be performed in the memory data structure. In one embodiment of the present invention, the results for the calculated KPI may be cached for faster data retrieval and calculation. The calculation may be performed using one or more programming language expressions, such as but not limited to, C#, SQL, .NET, or any other customized language, according to an embodiment of the invention. For example, a typical C# expression for calculation of the growth may be: @growth=if ( @value[pyp(1)]==0, 0, (@value-@value[pyp(1)])/@value[pyp(1)]). In one embodiment of the present invention, factoring module 504 may further apply factors on the results generated by KPI module 506.

Pivot module 508 may generate data for presenting trend reports based on the results from factoring module 504 and/or KPI module 506, according to one embodiment. In one embodiment of the present invention, pivot module 508 may pivot the result based on pivot configuration in the query. FIGS. 6A and 6B illustrate an exemplary result as an unpivoted table 602 and a pivoted table 604, in accordance with an embodiment of the present invention. As shown, pivoted table 604 may be result of the processing performed by pivot module 508. In one embodiment of the present invention, pivot module 508 may generate pivoted table 604 from unpivoted table 602 by specifying the month as a pivot. As a result, the data in unpivoted table 602 is re-arranged to show pivoted table 604 with month as columns. Therefore, different views of the output data may be generated for presentation at client 102.

In one embodiment of the present invention, formatting module 510 that formats the output for display at client 102. The formatting of the output by formatting module 510 may include, but not limited to, sorting, applying number format, hide/display column, format rows in flat/hierarchical in which parent row may be expanded in order to expose child rows, evaluating final column rows, and the like. An exemplary output data 702 is illustrated in FIG. 7, in accordance with an embodiment of the present invention. As shown, output data 702 is in JSON expression, however a person skilled in the art will appreciate that any programming language format may be used. In one embodiment of the present invention, output data 702 may be processed by applications 104 of client 102 to display the data to user 116. For example, a browser application on client 102 may process output data 702 to generate a pivoted table (such as pivoted table 604).

Figure 8:
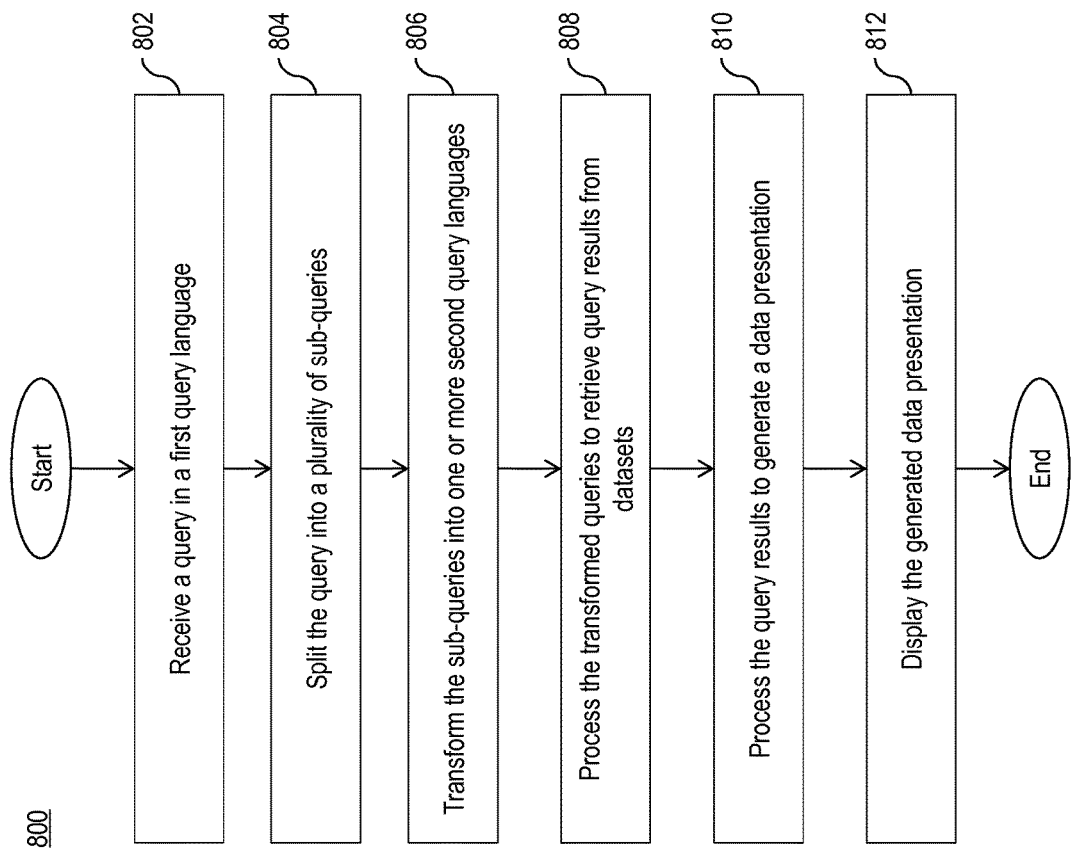
FIG. 8 illustrates a flowchart of a method for data retrieval from datasets, according to an embodiment of the present disclosure.

FIG. 8 illustrates a flowchart of a process 800 for data retrieval from datasets, according to an embodiment of the present disclosure. Process 800 begins at step 802, at which a query is received at query engine 112, according to an embodiment of the present invention. The query may be related to data retrieval from datasets 114 or to configure data models associated with datasets 114.

In one embodiment of the present invention, the received query may be in a first query language. The first query language may be, but is not restricted to, JSON, according to an embodiment. Query engine 112 may analyze the query for its structure and components, such as the objects, attributes and properties. Further, query engine 112 determines configuration information from configuration 118, in one embodiment of the present invention. Moreover, query engine 112 may validate the query for one or more KPIs in the received query. In an embodiment of the present invention, the data model may be modified by a user. For example, the modifications may include, but are not restricted to, addition of a new attribute or KPIs, change order of attributes, modify formats of attributes and the like. In another embodiment of the present disclosure, configuration 118 may be modified to specify access on the data to users 116 or client 102.

Next, the control of process 800 proceeds to step 804, at which query engine 112 splits the query into one or more sub-queries. In one embodiment of the present invention, the splitting of the query into the sub-queries is based at least in part on the configuration information, the components of the query, or a combination thereof. For example, a query 's1' may be split into three sub-queries such as a first sub-query 'sq1', a second sub-query 'sq2', and a third sub-query 'sq3'.

Thereafter, the control of process 800 proceeds to step 806, at which the plurality of sub-queries are transformed into one or more second query languages. In one embodiment of the present invention, the one or more second query languages correspond to datasets 114. For example, the second query language may be MDX, SQL, and the like. Subsequently, the control of process 800 proceeds to step 808, at which the transformed query may be processed to retrieve results from datasets 114, according to an embodiment of the present invention. Further, the retrieved results from the sub-queries may be merged. For example, results for sales data of January 2015 and January 2014 may be merged to generate an output data, such as growth value.

Next, the control of process 800 proceeds to step 810, at which the results are processed for presentation at client 102, in an embodiment of the present invention. In one embodiment of the present invention, the results may be processed at step 810 to apply various criteria or parameters such as the exchange rate parameter and/or the factoring parameter. Further, the factored query results may be evaluated for KPI formulas to generate output values, in one embodiment of the present invention. These parameters and formulas are explained in detail in conjunction with FIGS. 5 and 6. Moreover, the output values may be processed to generate pivot representation. In one embodiment of the present invention, the query results are formatted for output of display at client 102. The formatting of the output by formatting module 510 may include, but not limited to, sorting, applying number format, hide/display column, format rows in flat/hierarchical in which parent row may be expanded in order to expose child rows, evaluating final column rows, and the like. Thereafter, the control of process 800 proceeds to step 812, at which the output data is displayed to user 116 at client 102, according to an embodiment of the present invention.

Figure 9:
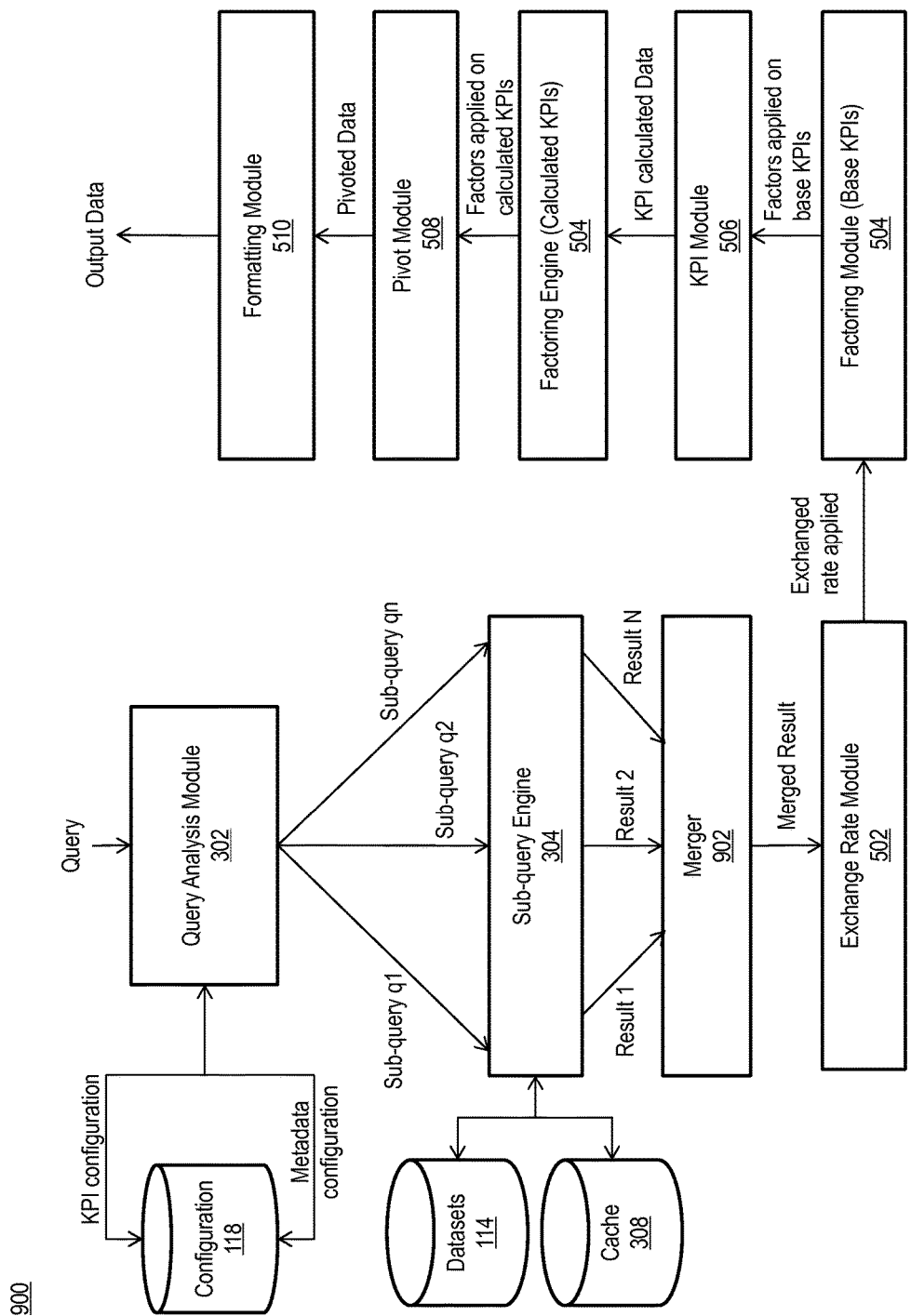
FIG. 9 illustrates a flow diagram of the process performed by the system for data retrieval from the datasets, according to another embodiment of the present disclosure.

FIG. 9 illustrates an exemplary flow diagram of a process 900 performed by system 100 for data retrieval from the datasets, according to another embodiment of the present disclosure. A query is received by query analysis module 302. The query may be defined by using a set of one or more objects, such as but are not restricted to, a list of attributes, a list of KPIs, filters, exchange rates, factors, formatter, or a combination thereof.

Query analysis module 302 may analyze the received query, and also retrieves KPI configurations and metadata configurations, and other configurations from configuration 118. Further, query module 202 may then validates names of the KPIs and columns associated with the query. Query analysis module 302 may split the query into multiple sub-queries, sub-query q1-qn for processing by sub-query engine 304. The sub queries may include objects such as, but are not limited to, a list of attributes, a list of KPIs, and filters, or a combination thereof. In one embodiment of the present invention, more than one sub-query engine may be used by query engine 112. Sub-query engine 304 transforms the sub-queries into one or more second programming languages and retrieves data from datasets 114. Further, as noted previously, sub-query engine 304 may use cache 308 for faster processing of the data. Subsequently, the results from sub-query engine 304 are merged 902.

The merged results are then processed by exchange rate module 502 to apply exchange rate parameter. As noted previously, the exchange rate parameter includes the exchange rate that may be determined from the query. In one embodiment of the present invention, the exchange rate parameters may be determined from configuration 118. The processed results are then factored by factoring module 504. In one embodiment of the present invention, factoring module 504 may apply factoring parameters. For example, the factoring module may factor only by determining base KPIs to generate factored query results.

The factored query results may then be processed by KPI module 506 to generate calculated values. The calculated values may again be processed by factoring module 504 to apply factors. Thereafter, pivot module 508 processes the calculated values to generate a data for representation. For example, the data generated by pivot module 508 may be used to generate reports, such as shown in FIGS. 6A and 6B.

The pivot data may then be processed by formatting module 510 to generate output data. Formatting module 510 may format the result, which may include, sorting, applying number format, hide/display column, format rows in flat/hierarchical in which parent row may be expanded in order to expose child rows, evaluating final column rows, and the like. The exemplary output data format generated by formatting module 510 is illustrated in FIG. 7. The output data may subsequently be transmitted from query engine 112 to client 102 for display to user 116. As noted previously, the output data may be processed by an application such as browser at client 102 to display to user 116. In one embodiment of the present invention, user 116 can interact with the output data. Further, the interaction with the output data may result in more queries that are processed by query engine 112 to provide dynamic data retrieval from datasets 114. In one embodiment of the present invention, user 116 may send queries to configure the data model for retrieval of data from datasets 114.

Figure 10:
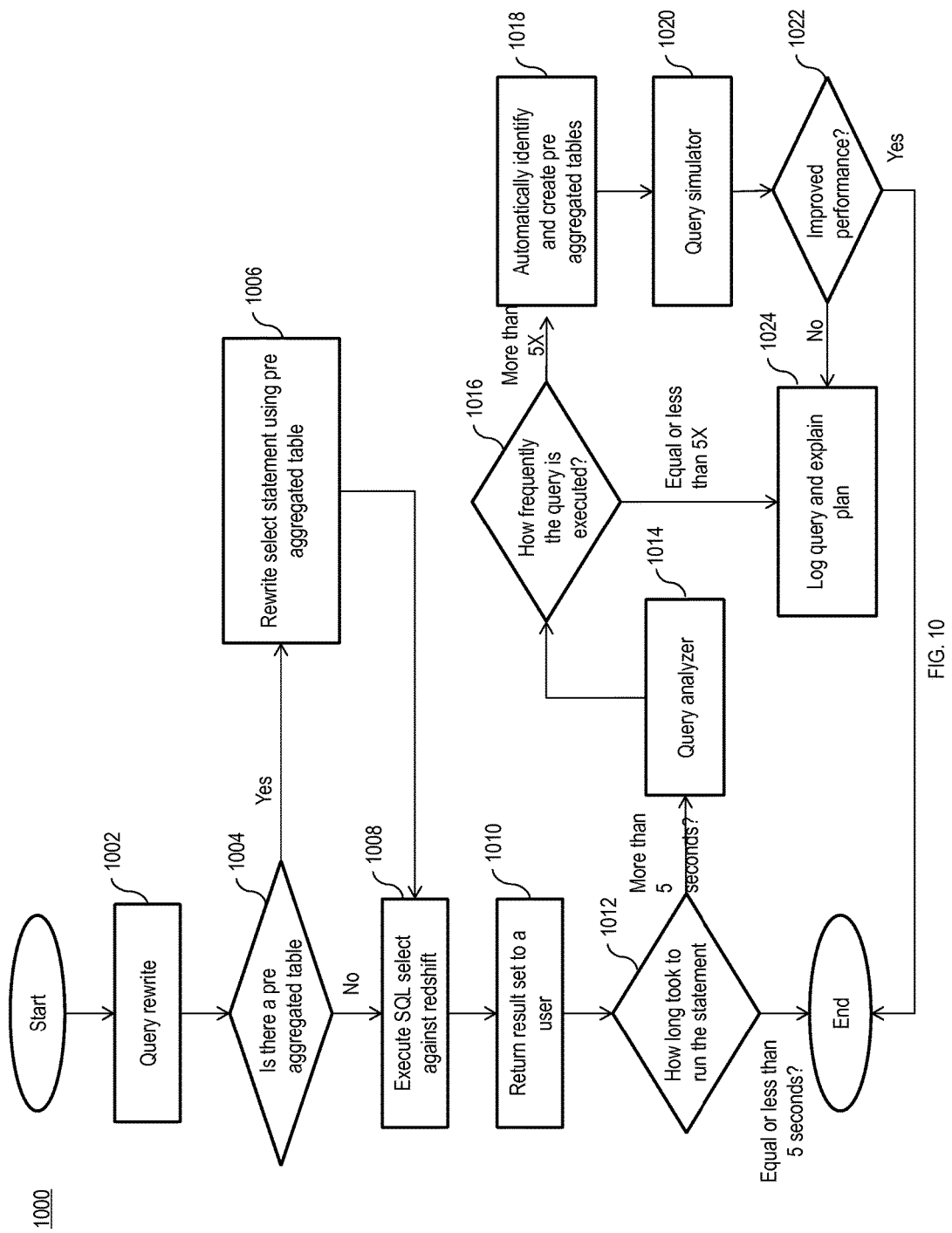
FIG. 10 illustrates a flowchart of a method for optimizing performance of the system, according to an embodiment of the present disclosure.

FIG. 10 depicts a method 1000 for optimizing performance of system 100, according to an embodiment of the present invention. A control of process 1000 proceeds to step 1002, at which a query is rewritten or redefined for various objects and parameters. Next, the control of process 1000 proceeds to step 704, at which it is determined whether a pre-aggregated table is available. In one embodiment of the present invention, the pre-aggregated table may be stored in configuration 118.

If the pre-aggregated table is available, then process 1000 proceeds towards step 1006, at which the query is rewritten by using the pre-aggregated table. Otherwise, process 1000 proceeds towards step 1008, at which the database query statement (e.g., the rewritten statement generated by step 1006) is applied to a database (e.g., a cloud-based database known in the art such as Amazon Redshift™). Generally, the database query may relate to the change in the data value based on the rewritten query of step 1002 or step 1006.

Next, the control of process 1000 proceeds to step 1010, at which a result set may be provided to the user. Subsequently, at step 1012, the time period used to run the statement or query is determined. In one embodiment of the present invention, if the time period is equal to or less than predefined time duration then process 1000 terminates. Otherwise, process 1000 proceeds to step 1014, at which the query is analyzed. For example, the predefined time duration may be five seconds.

Thereafter, the control of process 1000 proceeds to step 1016, at which it is determined how frequently the query had been executed. The frequency of execution refers to the number of times that the same query is executed, either by one user or a group of users. In one embodiment of the present invention, if it is determined that the query is executed more than a predefined frequency (or more than a predefined number of times), then process 1000 proceeds towards step 1018. Otherwise, process 1000 proceeds towards step 1024. For example, the predefined frequency may be five times. Subsequently, at step 1018, process 1000 automatically identifies attributes in the query and generates pre-aggregated tables.

Next, the control of process 1000 proceeds to step 1020, at which the query is simulated. For example, the query may be simulated in a sandbox mode without presentation to the user. Thereafter, the control of process 1000 proceeds to step 1022, at which it is determined an improvement in the performance of system 100. If the performance has improved, then process 1000 terminates. Otherwise, at step 1024, the query is logged and explanation of a plan is generated.

Figure 11:
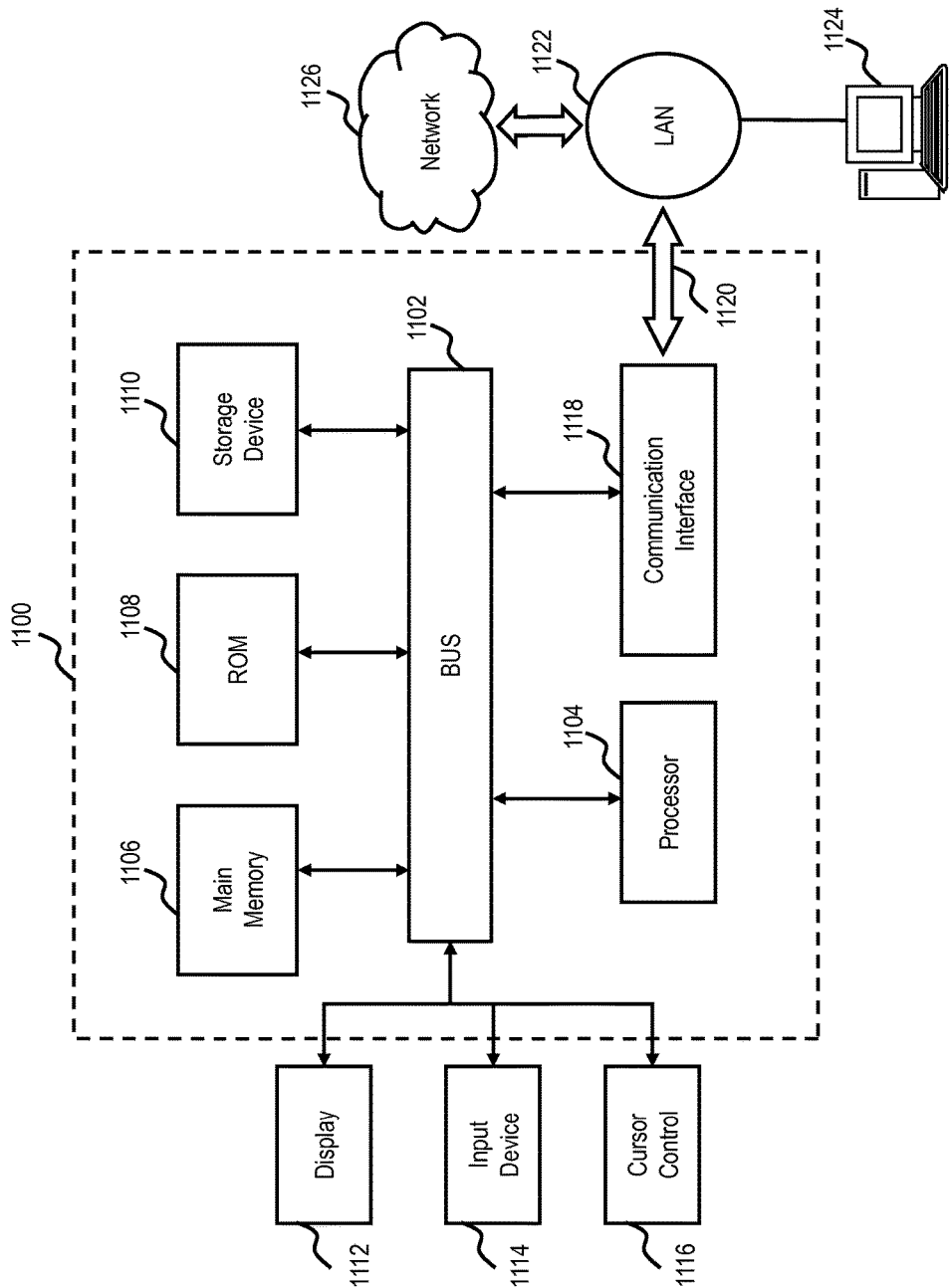
FIG. 11 depicts a computer system that can be used to implement various exemplary embodiments of the present disclosure.

FIG. 11 illustrates a computing system (e.g., a server or a client) 1100 on which exemplary embodiments may be implemented. Computing system 1100 includes a bus 1102 or other communication mechanism for communicating information and a processor 1104 coupled to bus 1102 for processing the information. Computing system 1100 also includes a main memory 1106, such as a Random Access Memory (RAM) or other dynamic storage device, coupled to bus 1102 for storing the information and instructions to be executed by processor 1104. Main memory 1106 may also be used for storing temporary variables or other intermediate information during execution of instructions by processor 1104. Computing system 1100 may further include a Read Only Memory (ROM) 1108 or other static storage device coupled to bus 1102 for storing static information and instructions for processor 1104. A storage device 1110, such as a magnetic disk or an optical disk, is coupled to bus 1102 for persistently storing information and instructions.

Computing system 1100 may be coupled via bus 1102 to a display 1112, such as a Cathode Ray Tube (CRT), a liquid crystal display, an active matrix display, or a plasma display, for displaying information to the user. An input device 1114, such as a keyboard including alphanumeric and other keys, is coupled to bus 1102 for communicating information and command selections to processor 1104. Another type of a user input device may be a cursor control 1116, such as a mouse, a trackball, or cursor direction keys, for communicating direction information and command selections to processor 1102 and for controlling cursor movement on display 1112.

According to an exemplary embodiment, the processes described herein are performed by computing system 1100, in response to processor 1104 executing an arrangement of instructions contained in main memory 1106. Such instructions may be read into main memory 1106 from another computer-readable medium, such as storage device 1110. Execution of the arrangement of instructions contained in main memory 1106 causes processor 1104 to perform the process steps described herein. One or more processors in a multi-processing arrangement may also be employed to execute the instructions contained in main memory 1106. In alternative embodiments, hard-wired circuitry may be used in place of or in combination with software instructions to implement exemplary embodiments. Thus, exemplary embodiments are not limited to any specific combination of hardware circuitry and software.

Computing system 1100 may also include a communication interface 1118 coupled to bus 1102. Communication interface 1118 provides a two-way data communication coupling to a network link 1120 connected to a Local Area Network (LAN) 1122. For example, communication interface 1118 may be a Digital Subscriber Line (DSL) card or modem, an Integrated Services Digital Network (ISDN) card, a cable modem, a telephone modem, or any other communication interface to provide a data communication connection to a corresponding type of communication line. As another example, communication interface 1118 may be a Local Area Network (LAN) card (e.g., for Ethernet™ or an Asynchronous Transfer Mode (ATM) network) to provide a data communication connection to a compatible LAN. Wireless links may also be implemented, in one embodiment. In any such implementation, communication interface 1118 sends and receives electrical, electromagnetic, or optical signals that carry digital data streams representing various types of information. Further, communication interface 1118 may include peripheral interface devices, such as a Universal Serial Bus (USB) interface, a Personal Computer Memory Card International Association (PCMCIA) interface, etc. Although a single communication interface 1118 is depicted in FIG. 11, multiple communication interfaces may also be employed.

Network link 1120 typically provides data communication through networks to other data devices. For example, network link 1120 may provide a connection through LAN 1122 to a host computer 1124, which has connectivity to a network 1126 (e.g., a Wide Area Network (WAN) or the global packet data communication network now commonly referred to as the "Internet") or to data equipment operated by a service provider. LAN 1122 and network 1126 both use electrical, electromagnetic, or optical signals to convey information and instructions. The signals through the various networks and the signals on network link 1120 and through communication interface 1118, which communicate digital data with computing system 1100, are exemplary forms of carrier waves bearing the information and instructions.

Computing system 1100 may send messages and receive data, including program code, through the network(s), network link 1120, and communication interface 1118. In the Internet example, a server (not shown) might transmit requested code belonging to an application program for implementing an exemplary embodiment through network 1126, LAN 1122 and communication interface 1118. Processor 1104 may execute the transmitted code while being received and/or store the code in storage device 1110, or other non-volatile storage for later execution. In this manner, mobile system 800 may obtain application code in the form of a carrier wave.

The term "computer-readable medium" as used herein refers to any medium that participates in providing instructions to processor 1104 for execution. Such a medium may take many forms, including but not limited to non-volatile media, volatile media, and transmission media. Non-volatile media may include, for example, optical or magnetic disks, such as storage device 1110. Volatile media may include a dynamic memory, such as main memory 1106. Transmission media may include coaxial cables, copper wire and fiber optics, including the wires that include bus 1102. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read. In certain cases, the computer readable media may include an unknown physical component wherein the information is uniquely defined by a special digital unique identifier and is available through multiple physical channels either simultaneously or exclusively.

Various forms of computer-readable media may be involved in providing instructions to a processor for execution. For example, the instructions for carrying out at least part of the exemplary embodiments may initially be borne on a magnetic disk of a remote mobile device. In such a scenario, the remote mobile device loads the instructions into the main memory and sends the instructions over a telephone line using a modem. A modem of a local computer system receives the data on the telephone line and uses an infrared transmitter to convert the data to an infrared signal and transmit the infrared signal to a portable computing device, such as a Personal Digital Assistant (PDA) or a laptop. An infrared detector on the portable computing device receives the information and instructions borne by the infrared signal and places the data on a bus. The bus conveys the data to a main memory, from which a processor retrieves and executes the instructions. The instructions received by the main memory can optionally be stored on storage device either before or after execution by processor.

Embodiments of the present invention include a system having one or more processing units coupled to one or more memories. The one or more memories may be configured to store software that, when executed by the one or more processing unit, allows practice of embodiments described herein.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit embodiments of the invention to the precise form disclosed. Modifications and variations are possible in light of the above teachings or may be acquired from practice of embodiments of the invention. Certain exemplary embodiments may be identified by use of an open-ended list that includes wording to indicate that the list items are representative of the embodiments and that the list is not intended to represent a closed list exclusive of further embodiments. Such wording may include "e.g.", "etc.," "such as," "for example", "and so forth", "and the like", etc., and other wording as will be apparent from the surrounding context.

No element, act, or instruction used in the description of the present application should be construed as critical or essential to embodiments of the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

What is claimed is:

1. A computer-implemented method to retrieve data from one or more datasets, comprising:
   receiving at least one query in a first query language, wherein the at least one query includes one or more key performance indicators that are related to a performance of an entity;
   retrieving configuration information from a configuration database, wherein the configuration information includes at least key performance indicator configurations;
   validating the one or more key performance indicators in the at least one query based on the retrieved configuration information;
   splitting the at least one query in the first query language into a plurality of sub-queries;
   transforming the plurality of sub-queries into one or more second query languages, wherein the one or more second query languages correspond to the one or more datasets;
   processing the one or more transformed queries to retrieve one or more query results from the one or more datasets; and
   processing the one or more query results to generate a data presentation, wherein the processing the one or more query results to generate the data presentation further comprises:
      processing the one or more query results based on at least one exchange rate parameter;
      factoring the one or more processed query results based on at least one factoring parameter, wherein the at least one factoring parameter is based on at least one of a therapeutic benefit of a dosage of a medicine and a market share of a medicine for a disease; and
      generating one or more calculated values based on the one or more factored query results.

2. The method of claim 1, further comprising:
merging the one or more of query results associated with the plurality of sub-queries.

3. The method of claim 1, further comprising:
processing the at least one query in the first query language for one or more objects, wherein the splitting the at least one query is based on the one or more query objects.

4. The method of claim 3, wherein the one or more objects include at least one of a list of attributes, a list of key performance indicators, a filter, an exchange rate, a factor, a for-matter, or a combination thereof.

5. The method of claim 1, further comprising:
generating pivot data based on the calculated values.

6. The method of claim 5, further comprising formatting the pivot data to generate output data, wherein the data presentation is generated based on the output data.

7. A system to retrieve data from one or more datasets, comprising:
a query analysis module configured to:
receive the at least one query in a first query language, wherein the at least one query includes one or more key performance indicators that are related to a performance of an entity;
retrieve configuration information from a configuration database, wherein the configuration information includes at least key performance indicator configurations;
validate the one or more key performance indicators in the at least one query based on the retrieved configuration information; and
split the at least one query in the first query language into a plurality of sub-queries;
a sub-query engine coupled, at least, to the query analysis module, wherein the sub-query engine is configured to:
transform the plurality of sub-queries into one or more second query languages, wherein the one or more second query languages correspond to the one or more datasets; and
process the one or more transformed queries to retrieve one or more query results from the one or more datasets; and
an output module coupled, at least to, the sub-query engine, wherein the output module is configured to process the one or more query results to generate a data presentation, wherein the output module is further configured to:
process the one or more query results based on at least one exchange rate parameter;
factor the one or more processed query results based on at least one factoring parameter, wherein the at least one factoring parameter is based on at least one of a therapeutic benefit of a dosage of a medicine and a market share of a medicine for a disease; and
generate one or more calculated values based on the one or more factored query results.

8. The system of claim 7, wherein the sub-query engine is further configured to merge the one or more of query results associated with the plurality of sub-queries.

9. The system of claim 7, wherein the query analyzer is further configured to process the at least one query in the first query language for one or more objects, wherein the splitting the at least one query is based on the one or more query objects.

10. The system of claim 9, wherein the one or more objects include at least one of a list of attributes, a list of key performance indicators, a filter, an exchange rate, a factor, a formatter, or a combination thereof.

11. The system of claim 7, wherein the output module is further configured to:
generate pivot data based on the calculated values.

12. The system of claim 11, wherein the output module is further configured to format the pivot data to generate output data, wherein the data presentation is generated based on the output data.

13. The system of claim 7, wherein the sub-query engine is further configured to configure the one or more datasets based on the one or more query.

14. A computer-implemented method to retrieve data from one or more datasets, comprising:
receiving a query to retrieve data and configuration of one or more datasets, wherein the query is in a first query language, and wherein the query includes a list of key performance indicators related to a performance of an entity;
retrieving configuration information from a configuration database, wherein the configuration information includes at least key performance indicator configurations;
validating the list of key performance indicators in the query based on the retrieved configuration information;
splitting the at least one query in the first query language into a plurality of sub-queries;
transforming the plurality of sub-queries into one or more second query languages, wherein the one or more second query languages correspond to the one or more datasets;
configuring one or more data models in the one or more datasets based on the one or more sub-queries;
processing the one or more transformed queries to retrieve one or more query results from the one or more datasets; and
processing the one or more query results to generate a data presentation, wherein the processing the one or more query results to generate the data presentation further comprises:
processing the one or more query results based on at least one exchange rate parameter;
factoring the one or more processed query results based on at least one factoring parameter, wherein the at least one factoring parameter is based on at least one of a therapeutic benefit of a dosage of a medicine and a market share of a medicine for a disease; and
generating one or more calculated values based on the one or more factored query results.

15. The method of claim 14, further comprising:
merging the one or more of query results associated with the plurality of sub-queries.

16. The method of claim 14, further comprising:
processing the at least one query in the first query language for one or more objects, wherein the splitting the at least one query is based on the one or more query objects.

17. The method of claim 16, wherein the one or more objects include at least one of a list of attributes, the list of key performance indicators, a filter, an exchange rate, a factor, a formatter, or a combination thereof.

18. The method of claim 14, further comprising formatting the at least one query result, wherein the data presentation is generated based on the formatting of the at least one query result.

* * * * *